Oct. 26, 1965     B. C. ROEMER     3,213,561
ICE FISHING TIP-UP
Filed June 5, 1963     2 Sheets-Sheet 2
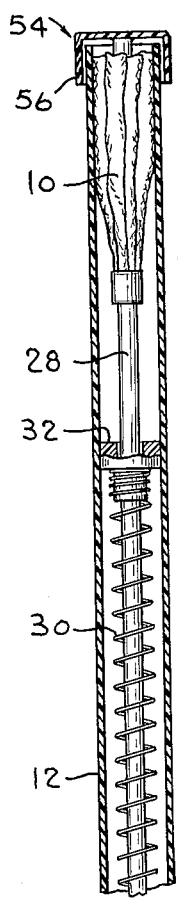
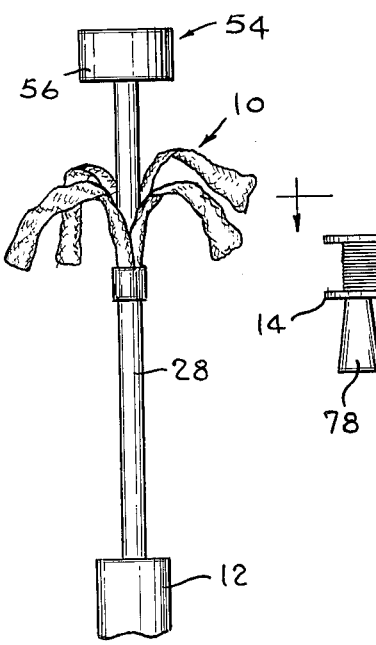
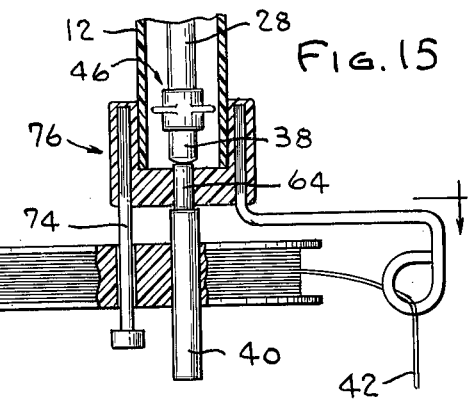
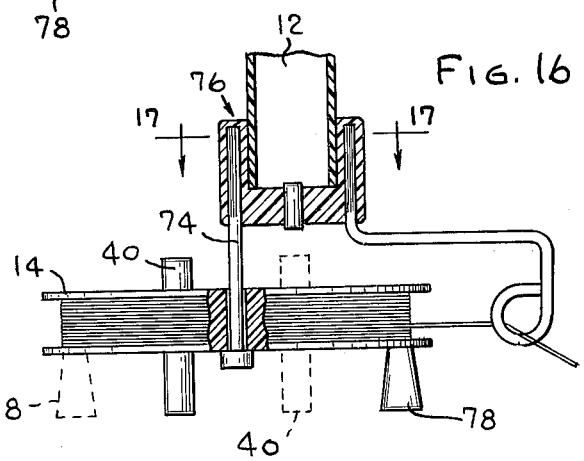
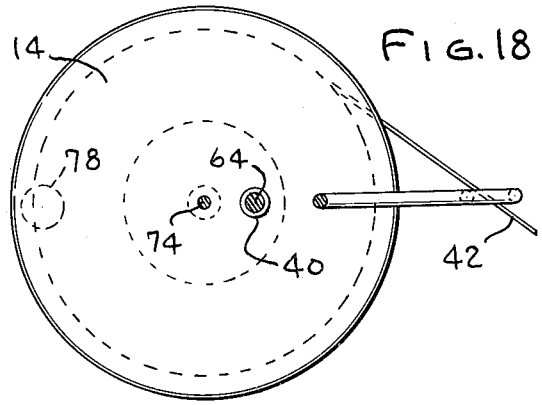
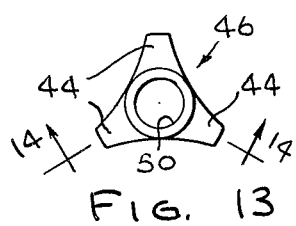
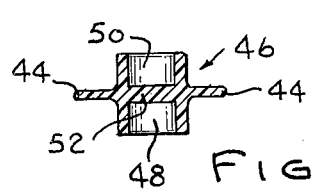
INVENTOR.
BENJAMIN C. ROEMER
BY John W. Michael
ATTORNEY United States Patent Office 3,213,561
Patented Oct. 26, 1965

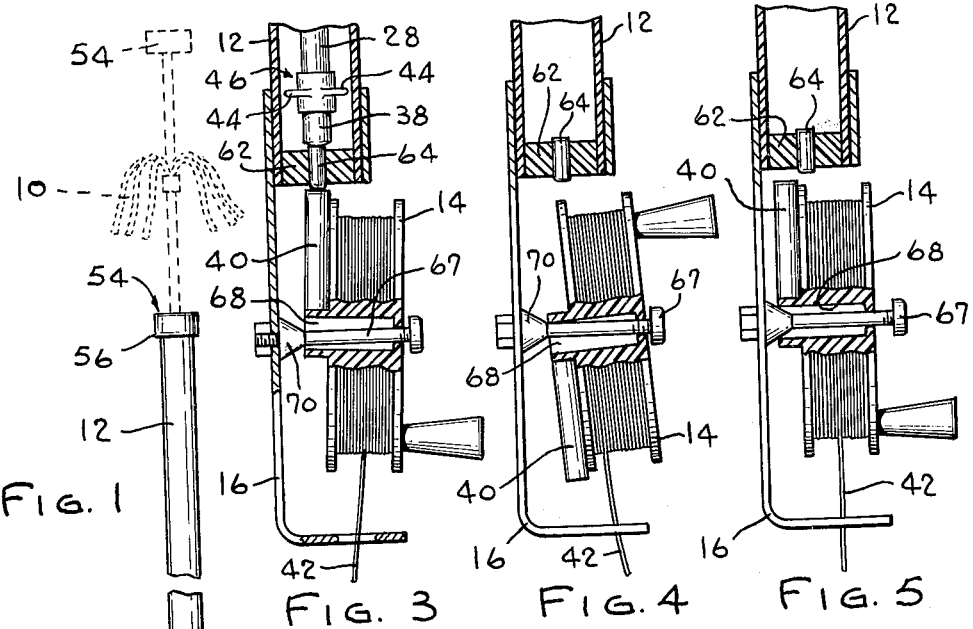
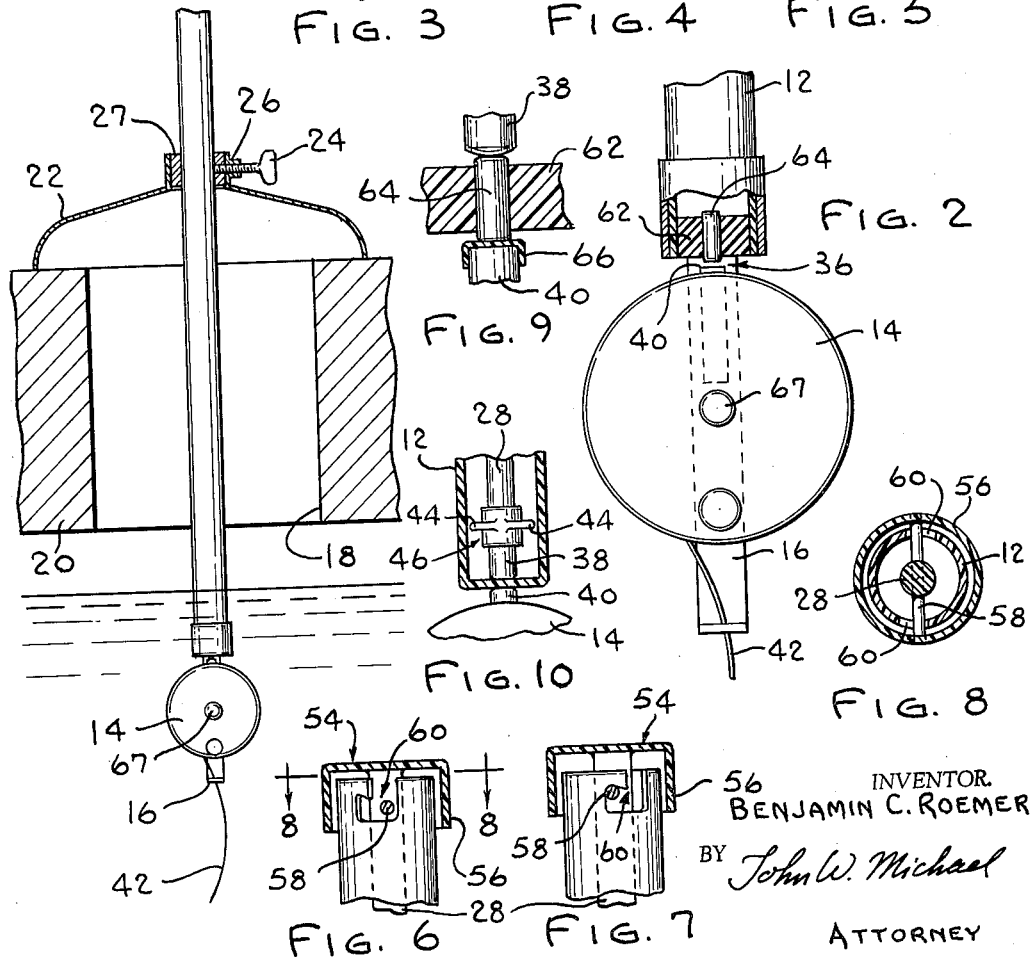

3,213,561
ICE FISHING TIP-UP
Benjamin C. Roemer, Manitowish Waters, Wis., assignor to Trueflight Mfg. Co., Manitowish Waters, Wis., a corporation of Wisconsin
Filed June 5, 1963, Ser. No. 285,648
15 Claims. (Cl. 43—17)

This invention pertains to improvements in ice fishing tip-ups.

In ice fishing the common practice is to fish through a plurality of holes in the ice by dropping a line and reel through each of the holes and connecting the reel by means of a trigger mechanism to a flag or similar visual signal which is normally in a retracted position but which is released in response to the movement of the reel when a fish strikes to give a visual signal of the strike to the fisherman. In this manner the fisherman is able to fish with a plurality of lines and is also free to take shelter from the elements while having only to attend to the lines when the tip-up indicates a strike.

A primary requirement of ice fishing equipment is that it perform equally satisfactorily over a wide range of winter weather conditions. To meet this requirement the tip-up design has to be such that the several tip-up components will not freeze up or be impaired in function when in use in extreme weather conditions. To prevent freezing it is standard practice to position the reel in the water below the ice when the tip-up is in use with the hooks baited.

One of the components, which prior to this invention had not been perfected to give satisfactory performance at all times, has been the trigger mechanism which releases the flag at the time of a strike.

A feature common to all tip-up devices known heretofore has been that the trigger mechanism in general is comprised of a latch which is mechanically connected to the flag and reel, and thus at least in part submerged in water, and which is moved upon rotation of the reel to release the flag. By virtue of being partly submerged in water for part of the time and removed therefrom during reeling, moisture and water tend to accumulate and freeze between the moving parts of the latch and thus render the latch inoperable or significantly impair its function. Attempts, of course, have been made to eliminate this condition, however, none have been fully successful.

Some tip-up designs call for the presence of lubricant between the moving parts of the latch of a type that does not congeal at water freezing temperatures; however, at extremely low temperatures the lubricant stiffens to the extent that the force required to actuate the trigger mechanism becomes excessive, especially so when fishing for smaller species of fish. Also, despite the efforts to prevent water or moisture entrance between the latch parts by means of the lubricant, this method does not assure absence of freeze-up, since after longer use and storage sufficient lubricant escapes and/or dries, thus permitting some water accumulation and eventual freeze-up of the parts.

Another approach has been to isolate the portion of the latch attached to the reel, and exposed to water, from the dry end of the latch which is attached to the flag. This has been accomplished by passing the latch through a flexible diaphragm which is permanently bonded to the latch, and by relying upon the motion of the latch which is transmitted through the diaphragm to actuate the flag. In this case again the flexibility of the diaphragm is affected by the low temperatures, thus varying the pull required to actuate the flag. Also, upon removing the device from the water at times of reeling and/or hooking a bait, a crust of ice tends to form on the exposed side of the diaphragm, thus impairing the flexibility of the diaphragm or rendering it stiff and inoperable.

The principal object of this invention therefore is to provide an ice fishing tip-up which will not be affected by the various winter weather conditions and which in particular will not have any of the above discussed detriments in triggering of the flag.

This object is attained by eliminating the latch and its mechanical connection between the reel and flag and by providing means for retaining the flag in the retracted position which does not require a mechanical connection between the two parts. In more detail, this is attained by completely sealing off the flag and its associated parts from the water and by holding the flag in a retracted position by means of a magnetic field and removing such field upon rotation of the reel to permit the flag to snap to an upright position.

Another object of this invention is to provide means for readily varying the line tension necessary to actuate the flag thereby rendering the tip-up adjustable for use with a particular type of bait and/or when fishing for a particular species of fish.

A further object of this invention is to provide a tip-up which will not be actuated by gusts of wind and thus will not give "false alarms" during windy days.

A still further object of this invention is to provide a tip-up in which its various components are designed particularly to function equally well under all winter weather conditions. These objects will be more fully appreciated from the detailed description in the specification.

Other objects and advantages will be pointed out in, or be apparent from, the specification and claims, as will obvious modifications of the two embodiments shown in the drawings, in which:

FIG. 1 is a side view of the tip-up as positioned on ice during fishing, with the stand shown in cross section, and with the flag shown in dotted lines in an exposed position;

FIG. 2 is a side view of the reel and a fractional section with part broken away and drawn in cross section of the tube;

FIG. 3 is a cross sectional view of a fragment of the tube and fragmentary cross sectional view of the reel, the parts being shown as positioned when the flag is in the retracted position;

FIG. 4 is a view similar to FIG. 3, the parts being shown as positioned when the flag has been released and is positioned in an exposed position;

FIG. 5 is a view similar to FIGS. 3 and 4, the parts being shown as positioned when reeling a catch;

FIG. 6 is a cross sectional view of the cap and a fragment of the tube shown in a position when the flag is in a retracted position;

FIG. 7 is a view on FIG. 6 showing the cap in a locked position;

FIG. 8 is a view taken on line 8—8 of FIG. 6;

FIG. 9 is a detail view of the magnetic coupling means and showing a spacer for varying the distance between the two parts of the coupling means;

FIG. 10 is a view showing a modification of the construction shown in FIG. 9;

FIG. 11 is a cross sectional view in side elevation of the tube showing the flag in a retracted position;

FIG. 12 is a view in side elevation of the flag in an exposed position, a fragment of the tube being shown;

FIG. 13 is a top view of the rod guide;

FIG. 14 is a view taken on line 14—14 of FIG. 13;

FIG. 15 is a view similar to FIG. 3 but showing modified means for securing the reel to the tip-up structure;

FIG. 16 is a view similar to FIG. 15, the parts being shown as positioned when the flag has been released and is positioned in an exposed position;

FIG. 17 is a view taken on line 17—17 of FIG. 16, and

FIG. 18 is a top view of the reel shown in FIGS. 15 and 16.

Referring to the drawings in detail, my invention pertains to a flag 10 which is movable from a retracted non-signaling position within a tube 12 to an exposed signaling position in response to rotational movement of a reel 14 to give the fisherman a visual signal of a strike at the tip-up.

The reel is secured to the tube 12 by means of a bracket 16 and is normally submerged in water when the tip-up is operably positioned over a hole 18 in the ice 20. The tip-up is retained in this position by a cup-shaped stand 22 which is of sufficient diameter to fully cover the hole 18, thereby preventing snow or other debris from entering the hole and interfering with or damaging the reel 14. The stand is adjustably secured to the tube 12 by an adjustment screw 24 in the collar 26 whereby the position of the reel in respect to the ice surface may be varied. A spacer 27 is provided between the rod and the collar, thereby permitting the collar to be of sufficient diameter to render the stand removable from the rod. In devices known heretofore the reel distance from the ice surface or from a comparable stand was not adjustable, thus, when fishing through ice which was thicker than the distance between the stand and reel, the latter would be exposed and susceptible to freezing up, and also the line would tend to rub against the bottom edge of the hole causing unwarranted drag and occasional snagging of the line. By incorporating the adjustment feature in the tip-up embodying my invention, I have eliminated the above mentioned freeze-up, as well as drag and snagging problems.

The flag 10 is attached to a rod 28 which is slidably mounted within the tube 12 and adapted to be biased to an exposed position (as in FIG. 12) by a tension spring 30. The spring is secured to the tube by spring holder 32 and to the rod by pin 34 and is expanded when the flag and rod are moved to a retracted position as shown in FIG. 11. In this position, of course, the spring continually biases the rod and flag upwardly. A tension spring, as compared to a compression spring, is better suited for this application, since it offers less resistance when pushing the rod to the retracted position than would be comparable compression spring.

To retain the flag in the retracted position, the tip-up is provided with a magnetic coupling 36 which is comprised of a rod coupling member 38 secured to the bottom end of the rod 28 and a reel coupling member 40 secured to the reel, whereby one of the members is made of a permanently magnetized material and the other of a ferrous material, and whereby the size and arrangement of the two members is such that the magnetic field created by the magnetized material is of sufficient strength to overcome the bias of the spring 30 when the flag is in the retracted position. The two coupling members are arranged in a close and opposing relationship to retain the flag in the retracted position, however, upon rotation of the reel in response to the pull on the line 42, the reel coupling member 40 moves away from the close and opposing position in respect to the other coupling member, thus releasing the rod and causing it to be moved to the exposed position by the spring 30. It is apparent that either member 38 or 40 could be the permanent magnet with the other of the members being of magnetizable material without affecting the funtcion of this coupling.

As the rod 28 travels upwardly after release of the coupling, its lower end is guided by flanged portions 44 of bushing 46. The bushing also permits an easy method for securing rod coupling member 38 to the rod 28 by bonding the former in the lower compartment 48 of the bushing, and bonding the rod in the upper compartment 50. If desired, the two compartments may be separated by a wall 52.

A cap 54 having a dependent flange 56 is secured to the top of the rod 28 and is adapted to overlie the open upper end of the tube 12 to prevent snow or other material from entering the tube. A pin 58 is provided close to the upper end of the rod and is adapted to cooperate with L-shaped notches 60 in the tube 12 to lock the rod and flag within the tube when the equipment is stored or on other occasions when it is not desired to have the flag and rod actuated.

The above described method of coupling has eliminated any mechanical link or connection between the rod and reel, and the retention of the rod iin the retracted position and its release is solely dependent upon the relative positions of the two parts. Since the mechanical linkage required on heretofore known tip-ups has been eliminated, the tube 12 can be completely sealed at its bottom as, for example, by a plug 62, as shown in FIG. 11, or the bottom can be made integral with the side walls of the tube as shown in FIG. 10. By so encapsuling the rod and protecting it from any exposure to the water, the freeze-up problem encountered heretofore has been completely eliminated. It is also of note that in the above described magnetic coupling the actuation of the flag and rod is in no way dependent upon the flexibility of the bottom wall of the tube, as is the case with tips-ups which actuate the rod by a latch passed through a flexible diaphragm.

In order to concentrate the magnetic flux path between the two coupling members, the tube 12, the plug 62, the rod guide 46, and the rod 28 can be made of non-ferrous material. Also, the last mentioned parts, as well as the cap 54, may be made of a non-ferrous material which is less wettable than metal thereby rendering the tip-up less susceptible to icing and more comfortable to the touch.

There can be several arrangements of the elements comprising the magnetic coupling 36. A preferred arrangement is one in which a magnetizable member 64 is molded or otherwise secured in the bottom wall or plug of the tube, which member serves to so concentrate the flux lines between the two coupler members 38 and 40 and thus permits the use of smaller coupler members than would otherwise be required. However, since the holding strength of the magnetic coupler is dependent upon the distance between the two members, a reduction in the thickness of the bottom wall, as seen when comparing FIGS. 9 and 10, will produce equivalent holding strength with the same sized magnet without the use of the magnetizable member 64.

Since the distance between the coupler members determines the holding strength of the coupler, and thus the pull required on line 42 to actuate the flag and rod, the tip-up embodying my invention may be easily adjusted to be actuated at a predetermined pull on the line 42 which would depend upon the types of fish that are to be caught and/or upon the bait used. The distance between the coupler members can be varied by providing a spacer cap 66 which can be mounted on the reel coupler 40, thereby changing the position of the reel coupler inwardly or outwardly so as to vary a space gap between the two members, or by changing the position of the reel coupler member in respect to the center of the reel thereby varying the torque which opposes rotary motion of the reel.

The reel 14 may be arranged to lie generally in the vertical plane as shown in FIGS. 1–5 or to lie in the horizontal plane as shown in FIGS. 15–18.

In the former case, the reel 14 is rotatably mounted on a horizontally extending shaft 67 which is secured to the bracket 16. The reel has a central aperture 68 which is of sufficient diameter to permit limited pivotal motion of the reel in respect to the shaft between the position shown in FIGS. 4 and 5, thereby permitting the reel to be tipped upwardly to move its coupling member 40 in contact (or in opposing but gapped relationship) with the member 64, or in contact with the bottom wall of the tube 12 (as in FIG. 10) to magentically retain the flag and rod 12 in the retracted position. As a strike occurs, the line 42 will invariably be pulled outwardly, causing the reel to rotate, thus rotating the coupling member 40 out of the coupling relationship with coupling member 38 thereby releasing the rod to the exposed position.

As seen in FIG. 4, the clearance provided between th shaft 67 and reel 14 permits the inside of the reel to tip downwardly after a strike, thereby providing sufficient clearance between the reel and the tube to permit free rotation of the reel. As seen in FIG. 5, when the catch is reeled in, the reel is moved inwardly whereby the aperture 68 is engaged by a tapered portion 70 of the shaft, thereby providing a reeling motion in a plane normal to the shaft 67. It is of note that during reeling again sufficient clearance is provided between the coupling member 40 and the tube.

When the reel is positioned on the horizontal plane, it may be mounted on a vertically extending shaft 74 molded in a cap 76 which serves to seal the bottom of the tube 12. The shaft is of sufficient length to permit some vertical motion of the reel, thereby allowing the reel to drop when coupling member 40 is moved out of coupling position upon rotation of the reel and providing sufficient clearance between the reel and the bottom of the tube. Although a knob 78 is shown, it is within the contemplation of this invention that the downwardly extending portion of the coupling member 40 could be utilized as a knob and that in that case the knob 78 could be eliminated. It is also of note that in this design the force required to initially rotate reel 14 is dependent upon the distance between the shaft 74 and the coupling member 40, and that such could be varied by providing suitable adjustment means (not shown) for changing the distance of the member 40 in respect to the shaft 74.

It also should be apparent from the above description of the tip-up embodying my invention, that the flag is completely enclosed in the tube 12 when the former is positioned in the retracted position, and that therefore the coupling mechanism cannot be tripped or forced open by wind or other weather conditions.

Although but two embodiments of the present invention have been illustrated and described, it will be apparent to those skilled in the art that various changes and modifications may be made therein without departing from the spirit of the invention or from the scope of the appended claims.

I claim:
1. An ice fishing tip-up, comprising:
a base for positioning the tip-up on ice;
a tube having a sealed end and an open end and connected to said base so that said sealed end is in a position below the surface of the ice when said base is positioned thereon and said open end is projecting above the surface of the ice;
a visual signal member mounted within said tube and movable in both directions between a nonsignaling position within said tube and a signaling position outside of said tube;
spring means connected to said signal member to bias said signal member for movement from said nonsignaling position to said signaling position, said spring means exerting a biasing force in a direction of said movement of said signal member when said signal member is in said nonsignaling position;
a rotatable reel, means connecting said reel to said tube to position said reel adjacent said sealed end; and
magnetic coupling means including a ferrous part and a permanently magnetized part, one of said parts being connected to said reel for movement therewith and the other of said parts being connected to said signal member for movement therewith, said parts being movable in respect to each other to a sufficiently close position to each other to cause said parts to provide a magnetic force greater than said biasing force when said signal member is in said nonsignaling position;
upon movement of said reel, said one of said parts being moved away from said close position to a position at which said parts are incapable of providing a magnetic force equal to said biasing force and thereby permitting said spring means to move said signal member to said position outside of said tube.

2. An ice fishing tip-up according to claim 1 wherein said visual signal member comprises a rod having a flag at its upper end, said rod being slidably positioned within said tube, and said spring means comprising a tension spring which is operably connected to said rod and is loaded when said rod and flag are moved to said nonsignaling position.

3. An ice fishing tip-up according to claim 2 wherein said other of said parts of said magnetic coupling means is secured to the lower end of said rod.

4. An ice fishing tip-up according to claim 3 having a conductive piece secured in said sealed end, said conductive piece concentrating the flux lines of said magnetized part when said visual signal means is retained in said nonsignaling position.

5. An ice fishing tip-up according to claim 1 wherein said reel has mounting means for moving said reel from a position close to said sealed end of said tube to a position further away therefrom upon rotation of said reel.

6. An ice fishing tip-up according to claim 5 wherein said reel mounting means comprises a horizontally extending shaft and wherein said reel is pivotally mounted thereon and adapted to pivot towards and away from said sealed end of said tube.

7. An ice fishing tip-up according to claim 5 wherein said reel mounting means comprises a vertically extending shaft and wherein said reel is mounted for slidable motion in the vertical direction thereon and adapted to slidably move towards and away from said sealed end of said tube.

8. An ice fishing tip-up according to claim 1 wherein said base comprises a cup-shaped stand adapted to cover the hole in the ice and thereby shield said reel.

9. An ice fishing tip-up according to claim 8 wherein said tube is slidably supported by said base thereby permitting adjustment of the distance between said reel and said base.

10. An ice fishing tip-up comprising:
a base for positioning the tip-up on ice;
a visual signal means mounted on the base and including a signal member mounted for movement between a low and a high position, said visual signal means including a spring means adapted to bias said signal member toward its high position and a sealing means surrounding said signal member to seal said signal member from contact with the water when the tip-up is in a fishing position,
a reel means including a rotatable reel member adapted to be positioned under water when the tip-up is in a fishing position, means connecting said reel means to said signal means; and
magnetic coupling means including a ferrous part and a permanently magnetized part, one of said parts being mounted on said reel member and the other of said parts being mounted on said signal member, said magnetic coupling means adapted to retain said signal member in said low position against the bias of said spring means when said reel member is stationary and when said parts are in a relatively close position in respect to each other, and said coupling means being adapted to release said signal member for movement to said high position in response to the bias of said spring means when said reel member is moved to thereby move said parts away from said relatively close position.

11. An ice fishing tip-up according to claim 10 in which said reel member of said reel means is slidably mounted on its axis of rotation to permit movement of said reel member to a position in which, during the rotation of said reel member, the part mounted on said reel member moves outside the magnetic influence of said other part once said coupling means is released.

12. An ice fishing tip-up according to claim 10 in which said magnetic coupling means includes a cap of nonmagnetic material adapted for removable mounting on one of said parts to thereby vary the space between said parts and to thereby vary the force of magnetic attraction between said parts.

13. An ice fishing tip-up according to claim 10 in which said spring means includes a tension-type spring connected to said sealing means and signal member and is adapted to be put under tension and oppose movement of said signal member when said signal member is moved to its lower position.

14. An ice fishing tip-up, comprising:
a base for positioning the tip-up on ice;
a hollow member having a central cavity and having a sealed end, said member being connected to said base so that a portion of said member is positioned below and another portion is positioned above the surface of the ice when the tip-up is positioned thereon, said sealed end being in the portion of said member which is positioned below the surface of the ice;
a rotatable reel, means connecting said reel to said hollow member to position said reel adjacent said sealed end;
a visual signal member connected to said hollow member for movement in respect thereto between signaling and nonsignaling positions;
motor means connected to said visual member to exert a force thereon for moving said signal member from said nonsignaling to said signaling position; and
magnetic coupling means including a ferrous part and a permanently magnetized part, one of said parts being connected to said reel for movement therewith and the other of said parts being connected to said signal member for movement therewith, said parts being movable in respect to each other to a sufficiently close position to each other to cause said parts to provide a magnetic force greater than said force exerted by said motor means when said signal member is in said nonsignaling position and to cause said parts to coopearte to retain said signal member in said nonsignaling position;
upon movement of said reel, said one of said parts being moved away from said close position to a position at which said parts are incapable of providing a magnetic force equal to said force of said motor means and thereby permitting said motor means to move said signal member to said signaling position.

15. An ice fishing tip-up according to claim 14 in which said magnetic coupling means further includes a ferrous member mounted in said sealed end of said hollow member.

References Cited by the Examiner
UNITED STATES PATENTS

| | | | |
|---|---|---|---|
| 1,253,746 | 1/18 | Teeling | 43—17 |
| 2,198,286 | 4/40 | Krivutza | 43—17 |
| 2,575,156 | 11/51 | Baugh et al. | 43—17 X |
| 2,876,579 | 3/59 | Plouffe | 43—17 |
| 2,936,541 | 5/60 | Stanford | 43—17 |
| 3,032,913 | 5/62 | Voll | 43—44.91 |

ABRAHAM G. STONE, *Primary Examiner.*

SAMUEL KOREN, *Examiner.*